(12) United States Patent
Geiser et al.

(10) Patent No.: US 10,173,278 B2
(45) Date of Patent: Jan. 8, 2019

(54) METHOD AND APPARATUS FOR HARD FINISHING MODIFIED GEARS

(71) Applicant: Liebherr-Verzahntechnik GmbH, Kempten (DE)

(72) Inventors: Hansjoerg Geiser, Wiggensbach (DE); Robert Wuerfel, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 910 days.

(21) Appl. No.: 13/860,433

(22) Filed: Apr. 10, 2013

(65) Prior Publication Data

US 2013/0280990 A1 Oct. 24, 2013

(30) Foreign Application Priority Data

Apr. 17, 2012 (DE) .......................... 10 2012 007 687
Aug. 8, 2012 (DE) .......................... 10 2012 015 846

(51) Int. Cl.
  *B23F 5/04* (2006.01)
  *B23F 19/05* (2006.01)
  (Continued)

(52) U.S. Cl.
  CPC .............. *B23F 5/04* (2013.01); *B23F 19/002* (2013.01); *B23F 19/052* (2013.01);
  (Continued)

(58) Field of Classification Search
  CPC ...... B23F 23/1225; B23F 19/002; B23F 1/02; B24B 53/075
  (Continued)

(56) References Cited

U.S. PATENT DOCUMENTS 5,765,974 A * 6/1998 Faulstich ................ B23F 17/00
  409/38
6,390,893 B1 5/2002 Stadtfeld et al.
  (Continued)

FOREIGN PATENT DOCUMENTS

CH   389361 A    3/1965
CN   1701884 A   11/2005
  (Continued)

OTHER PUBLICATIONS

Korean Intellectual Property Office, Office Action Issued in Patent Application No. 10-2014-0098974, dated Jun. 21, 2016, 16 pages.
  (Continued)

*Primary Examiner* — Monica Carter
*Assistant Examiner* — Lauren Beronja
(74) *Attorney, Agent, or Firm* — McCoy Russell LLP

(57) ABSTRACT

The present disclosure relates to a method for the manufacture of a workpiece having a corrected gear geometry and/or a modified surface structure, in particular by a hard finishing process, in particular generation grinding or honing. Provision is made in this respect that it is achieved by a direct generation of a wobble movement and/or of an eccentricity of the tool that a modification, in particular a profile modification or profile waviness, and/or a defined periodic flank waviness is generated on the active surface of the workpiece machined therewith.

22 Claims, 5 Drawing Sheets

(51) Int. Cl.
*B23F 19/00* (2006.01)
*B23F 23/10* (2006.01)
*B23F 21/03* (2006.01)
*B23F 21/02* (2006.01)
*B24B 53/075* (2006.01)
*B23F 23/12* (2006.01)

(52) U.S. Cl.
CPC ............ *B23F 21/026* (2013.01); *B23F 21/03* (2013.01); *B23F 23/10* (2013.01); *B23F 23/1225* (2013.01); *B24B 53/075* (2013.01); *Y10T 29/49467* (2015.01)

(58) Field of Classification Search
USPC ............................................ 451/47, 5, 8–10
See application file for complete search history.

(56) References Cited

U.S. PATENT DOCUMENTS

| | | | | |
|---|---|---|---|---|
| 7,104,870 | B2* | 9/2006 | Fong | B23F 19/002 451/10 |
| 9,152,141 | B2* | 10/2015 | Neumaier | G05B 19/182 |
| 2009/0227182 | A1* | 9/2009 | Breith | B23F 23/1225 451/5 |
| 2012/0184187 | A1* | 7/2012 | Yanase | B23F 5/04 451/47 |

FOREIGN PATENT DOCUMENTS

| | | |
|---|---|---|
| CN | 101332524 A | 12/2008 |
| CN | 101516558 A | 8/2009 |
| CN | 101526129 A | 9/2009 |
| CN | 102029444 A | 4/2011 |
| DE | 202007014121 U1 | 12/2007 |
| JP | 2011079125 A | 4/2011 |

OTHER PUBLICATIONS

State Intellectual Property Office of the People's Republic of China, First Office Action Issued in Chinese Patent Application No. 2013101322188, dated Mar. 3, 2016, 19 pages.
State Intellectual Property Office of the People's Republic of China, Office Action Issued in Application No. 2013101322188, dated Oct. 28, 2016, 16 pages.

* cited by examiner

Figur 2 a
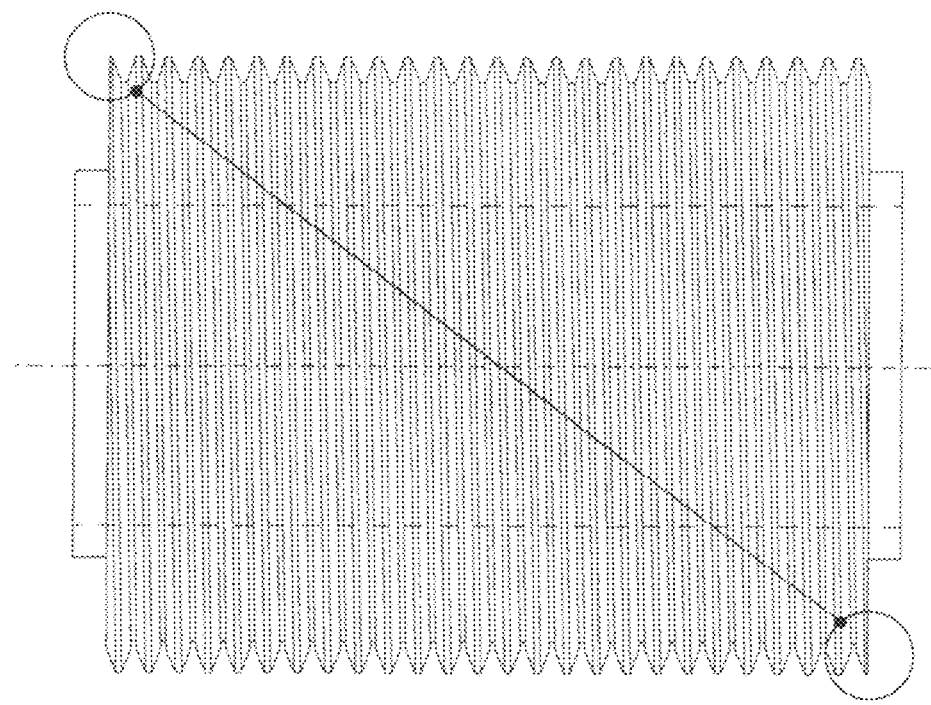
Figur 2 b
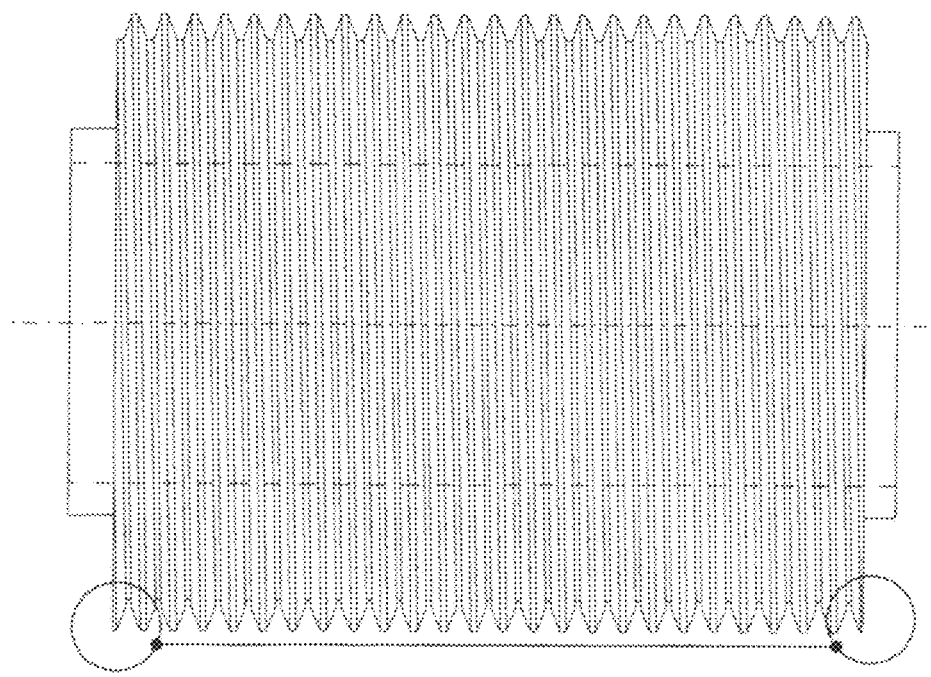

Figur 4a
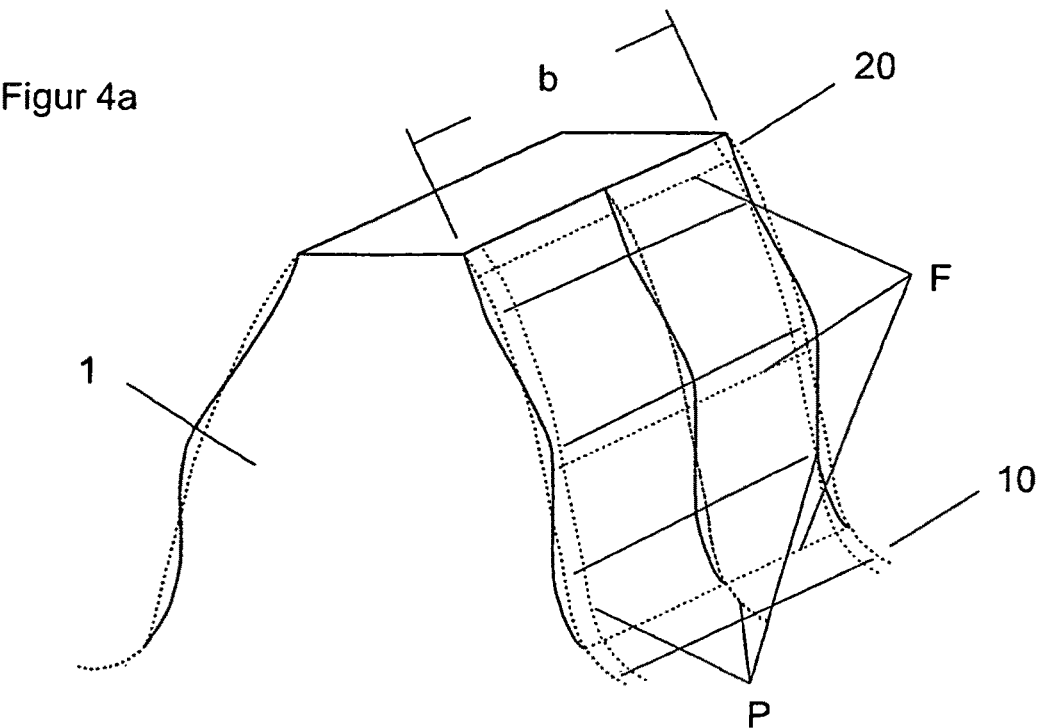
Figur 4b
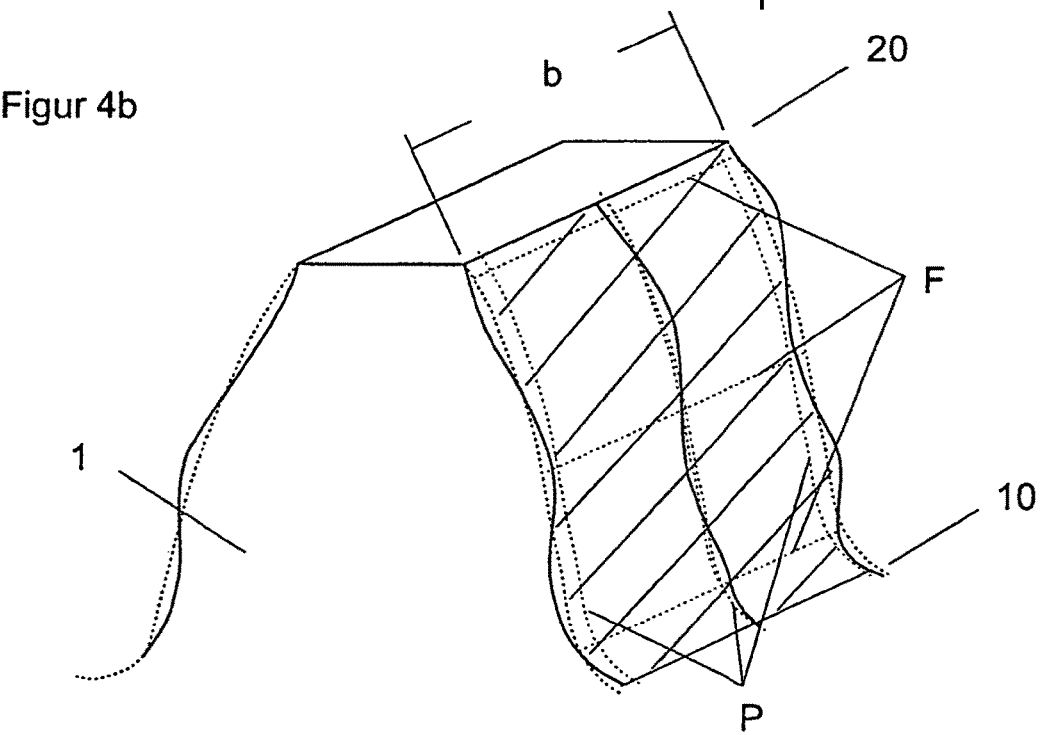

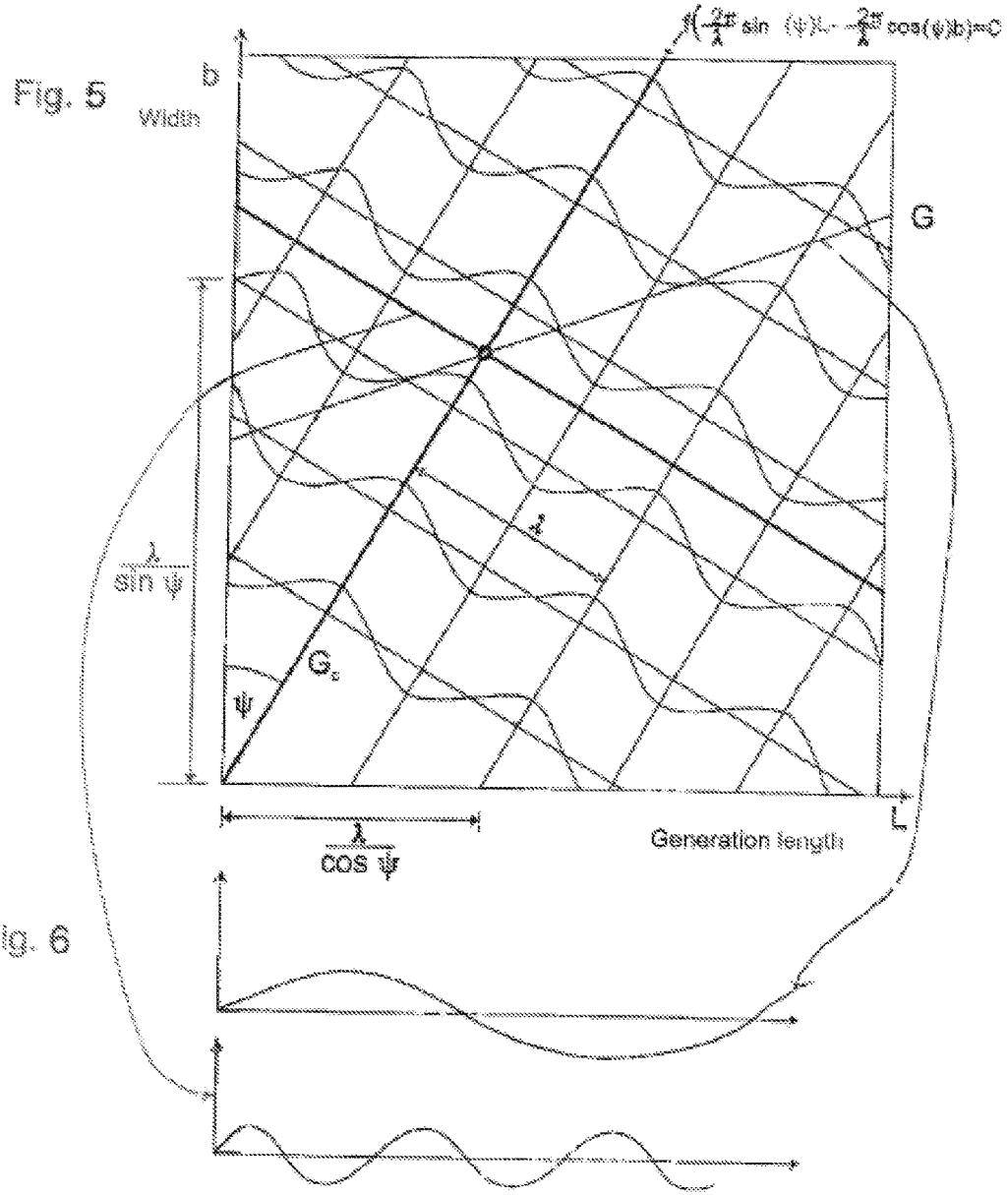

METHOD AND APPARATUS FOR HARD FINISHING MODIFIED GEARS

CROSS REFERENCE TO RELATED APPLICATIONS

This application claims priority to German Patent Application No. 10 2012 007 687.8, entitled "Method and Apparatus for Hard Finishing Modified Gears," filed Apr. 17, 2012, and also claims priority to German Patent Application No. 10 2012 015 846.7, entitled "Method and Apparatus for Hard Finishing Modified Gears," filed Aug. 8, 2012, both of which are hereby incorporated by reference in their entirety for all purposes.

TECHNICAL FIELD

The present disclosure relates to a method for the manufacture of a workpiece having a corrected gear geometry and a modified surface structure.

BACKGROUND AND SUMMARY

In applications having critical noise in heavy duty transmissions, topologically corrected gears modified in their surface structure are increasingly being used. The noise behavior of known transmissions is decisively influenced by the excitation from the gear provided. This influence of the gear geometry on the excitation behavior is explained by specific main geometry characteristics such as the profile and the overlap ratio as well as by the shape of the tooth flank topology. In addition, any even only slight production deviation from the fixed tooth flank geometry can have a negative effect on the excitation behavior.

It is currently being endeavored to optimize the excitation behavior with specific flank corrections in order thus to improve the noise behavior of certain types of transmission.

With gears having critical noise, a waviness can in this respect be specifically desired on the tooth flank to reduce or to prevent the noise excitation behavior of the gear wheel pairing.

It is the object of the present disclosure to provide the skilled person with a method for the manufacture of a workpiece having a modified surface structure and a corrected gear geometry which generates a modification, in particular a profile modification or profile waviness and/or a defined periodic flank waviness, on the active surface of the workpiece machined therewith or modifies or prevents an unwanted flank waviness.

This object is achieved by a method of manufacturing a workpiece in accordance with a method for the manufacture of a workpiece in particular by generation grinding or gear honing in which it is achieved by a specific generation of a wobble movement and/or of an eccentricity of the grinding tool or honing tool that a modification, in particular a profile modification or profile waviness and/or a defined periodic flank waviness, is generated on the active surface of the workpiece ground or honed therewith.

The profile modification in accordance with the present disclosure can in particular be utilized to generate a desired flank waviness on the active surface of the workpiece.

The profile modification in accordance with the present disclosure, however, likewise makes it possible to measure a periodic flank waviness at a finished workpiece and to compensate it by an oppositely directed correction in accordance with the method in accordance with the present disclosure, to modify it and/or to provide these corrections in the machining of further workpieces.

In accordance with the present disclosure, in this respect in a first embodiment for the manufacture of a workpiece having a corrected gear geometry and a modified surface structure a method is proposed for balancing the corresponding grinding tool in which a periodic flank waviness on the active surface of the ground workpiece is generated by a specific setting of a tool balance or tool imbalance. The surface geometry of the machined workpiece is thereby matched to the resulting demands.

Alternatively, the dresser for the tool can be controlled so that the tool surface of the grinding tool or honing tool is given a corresponding structure which generates a comparable surface geometry at the machined workpiece in a subsequent machining process.

The dressing tool can in particular be controlled in the dressing and profiling of the hard finishing tool so that a preferably periodic flank waviness is generated on the surface of the tool which in turn generates a comparable periodic flank waviness on the active surface of the workpieces ground/honed therewith.

The tool modified in its balance/imbalance and/or surface structure is in particular suitable for grinding or honing cylindrical spur gearing arrangements or helical gearing arrangements having a corrected gear geometry and a modified surface structure. These corrections can be superimposed on the correction movements such as correspond to the hard finishing of gears from the prior art. This also applies e.g. to spherical or conical gears such as beveloid gears.

The tool is in principle a worm grinding wheel or a honing ring or an externally toothed honing tool whose surface structure is dressed and profiled using a method of the prior art.

An imbalance, above all at the grinding tool, can have a plurality of reasons. A plurality of possibilities thus also arise to set or generate the balance/imbalance directly. Possible causes for an imbalance are e.g. the tool attachment, the tool design or its configuration and/or density differences in the tool blank. In addition, the imbalance can have its cause in the tools or in use at the reception capacity for cooling lubricant distributed differently over the periphery.

As a rule, the tools are balanced statically and dynamically on external balancing machines in the new state. For this purpose, balance weights which are attached laterally next to the tools are displaced for so long until the desired balance quality is achieved. This balancing can take place in one or two planes depending on the tool dimensions.

In addition, the tools are periodically dressed later in operation after a defined number of workpieces was machined by the tool and the tool therefore has to be dressed again. For this purpose, balancing heads are installed in the gear cutting machines or in the tool mounts which can be adjusted using an NC control in order thus to carry out the fine balancing within the machine.

Different points in time at which influence can be taken on the balancing quality or at which it is meaningful to set the balancing quality of the tool in accordance with the present disclosure result from these two balancing methods/balancing processes.

With new tools, the cause for the tool imbalance can also lie in an off-center tool attachment since the bore of the tool usually has a clearance, albeit a small one, with respect to the receiving mandrel. This eccentricity of the attachment mainly has the effect of a static imbalance. The tool run-out error resulting from the alignment state is eliminated in the subsequent first dressing in the machine. Since this in turn has effects on the balancing quality, this imbalance is preferably corrected on the external balancing machine and is only utilized in exceptional cases for the balance setting in accordance with the present disclosure.

The situation is different with the imbalance from the grinding tool configuration. There are better possibilities to set the balance/imbalance directly here.

The teeth at the grinding tool extend in helical form around the tool axis. The tool pitches end at an offset angle in the outer diameter of the worm grinding wheel in dependence on the tool width and tool module. If the pitches end offset by zero degrees, a dynamic imbalance arises; at an offset of 180 degrees, the consequence is a static imbalance. If the worm pitches end at intermediate angular positions, a combination of static and dynamic imbalance results. This influence only applies with single-pitch worm grinding wheels.

Up to now, the useful worm width of the cylindrical worm grinding wheel blank has usually been selected so that the dynamic imbalance caused by pitch geometry becomes minimal.

In line with the present disclosure, the width can now, however, also be selected directly in the manufacture of the new tool such that the pitch ends of the worm grinding wheel are arranged at different angular positions at the outer tool diameter and thus the grinding tool has a defined dynamic basic balance/imbalance inherent in the system.

Provision can alternatively or additionally be made that the tool is balanced on the grinding machine to provide the desired defined imbalance. A balancing head is advantageously installed for this purpose in the grinding machine or in the tool mount and can be adjusted by NC control in order thus to carry out the fine balancing within the machine.

The setting of the imbalance on the machine in this respect advantageously takes place periodically during the grinding operation. This is sensible in this respect since a rebalancing will always be necessary in the grinding process since the tool changes constantly by the periodic dressing process and the balance is also influenced in the grinding process by the reception of cooling lubricant.

The influence on the tool configuration can in particular be directly amplified or reduced in the rebalancing on the grinding machine by additional dynamic "changing/altering of the basic balance/imbalance.

A further possibility of generating periodic flank waviness in the machined workpieces comprises modifying the surface of the tool directly during the dressing and profiling process so that the desired surface geometry is generated in the workpieces machined therewith or an existing unwanted surface geometry is prevented.

This modification can be carried out instead or of in addition to the wobble movement of the tool.

In the following formulae

Index 1=tool

Index 2=workpiece applies.

The desired modification of the surface geometry of the workpiece on the gear flank can in particular have a constant value in the generation pattern at least locally in a first direction ($G_{C2}$) of the workpiece and can be given by a function f(x) in a second direction of the workpiece which extends perpendicular to the first direction ($G_{C2}$).

In this respect, in particular the first direction ($G_{C2}$) and the function f(x) can be predefined, for example for defining a desired modification or for compensating a measured, unwanted modification.

In this case, in accordance with the present disclosure, a modification of the surface geometry or the tool can be used for producing this modification of the surface geometry of the workpiece which likewise has a constant value at least locally in the generation pattern in a first direction ($G_{C1}$) of the tool.

A modification of the surface geometry of the tool is preferably used which is given at least locally by the same function, optionally compressed linearly by a factor c, f(cx) in a second direction of the tool which extends perpendicular to the first direction ($G_{C1}$).

In this respect, the geometry of the workpiece and the tool in a first embodiment in the generation pattern cannot only be described locally and/or in a partial region of the generation pattern, but also globally by the above-given formulae. In this case, the lines along which the modification has a constant value each form a straight line over the whole generation pattern or can be approximated by such with small differences.

Provision can, however, alternatively be made that the line along which the modification has a constant value does not form a straight line in the workpiece and/or in the tool, but is rather curved and/or has a plurality of part regions which do not extend in straight lines with respect to one another. In this case, the generation pattern can, however, be approximated in accordance with the present disclosure locally at at least one point by the above-described formulae and can preferably be approximated in each case locally by the above-described formulae preferably along the line or in partial regions. Optionally, in this respect, the function f( ) respectively have a different form for different regions along such a line.

The generation pattern then optionally has to be composed of a plurality of part regions described by formulae in accordance with the present disclosure.

The modification of the surface geometry is preferably defined by the formula:

$$f(2*pi/\text{lambda}_2*\cos(\text{psi}_2)*L_2 - 2*pi/\text{lambda}_2*\sin(\text{psi}_2)*b_2).$$

This formula also applies when unwanted flank waviness arises in the hard finishing process which can, however, be compensated by using this method.

Here f is a real-valued function which does not have to be periodic. f=sin can be selected in order to generate waviness, for example. The angle $psi_2$ defines the direction of a straight line ($G_{C2}$) on the gear flank on which the modification has a constant value. The modification has a form of f( ) along the straight line in every other direction.

It is compressed differently along the straight line in dependence on the direction. The compression is at a maximum (with waviness, the wavelength is minimal) on the straight line perpendicular to $G_{C2}$.

The Factor:

$$2*pi/\text{lambda}_2$$

determines the compression of the modification along the straight line perpendicular to $G_{C2}$.

For waviness, $lambda_2$ corresponds to the wavelength along the straight line parallel to $G_{C2}$. For the straight lines along a constant gear width, the compression amounts to:

$$2*pi/\text{lambda}_2*\cos(\text{psi}_2)$$

(with waviness,the wavelength is $lambda_2/\cos(psi_2)$), for straight lines along a constant generation length, the compression amounts to:

$$2*pi/\text{lambda}_2*\sin(\text{psi}_2)$$

(with waviness, the wavelength is $\text{lambda}_2/\cos(\text{psi}_2)$).

These formulae also apply, as already explained above, at least locally and/or in a partial region of the generation pattern; however, globally in a particularly simple case.

A modification, in particular a modification corresponding to the above-described modification of the workpiece, can be generated on the tool surface by dressing the tool (worm, honing wheel/honing ring) using a form roller. This can be achieved by one or more of the following corrections of the axial movements for conventional dressing kinematics:

a. Variation of the axial spacing of the dresser from the tool in dependence on the angle of rotation of the tool or on the tool width (infeed);

b. Variation of the axial feed of the tool or of the dresser in dependence on the angle of rotation of the tool or on the tool width (shift);

c. Variation of the crossed-axis angle of the tool and of the dresser in dependence on the angle of rotation of the tool or on the tool width (pivot); and d. Variation of the tool speed in dependence on the angle of rotation of the tool or on the tool width.

The form roller can in this respect in particular be in contact with the tooth of the tool from the base region to the crest region during dressing so that the eccentric modification takes place in one stroke over the whole tooth height.

Alternatively, the form roller can be in contact with the tooth of the tool only in partial regions between the base and the crest during dressing so that the eccentric modification takes place in several strokes (movement of the dressing roller in the direction of the tool axis) over the whole tooth height and with a respective different relative positioning of the dresser.

A modification of the type $$f(2*pi/\text{lambda}_1*\cos(\text{psi}_2)*L_2 - *pi/\text{lambda}_1*\sin(\text{psi}_1)*b_1).$$

can be generated on the tool by dressing with a form roller since the contact line of the dresser and of the tool, shown in a generation path-width diagram, is approximately a straight line. This straight line defines the straight line $G_{c1}$ (and thus the angle $\text{psi}_1$) since the corrections of the dressing kinematics have approximately the same effect on all points which lie along $G_{c1}$ and are thus dressed simultaneously. The contact line migrates along the tooth flank in the width direction during dressing.

If the contact line of the dresser and of the tool in contrast differs greatly from a straight line, the formula given above only applies locally or in partial regions of the contact line. The generation pattern then optionally has to be composed of a plurality of part regions described by formulae in accordance with the present disclosure.

If the dressing kinematics are varied so that a modification of the form $$f(-2*pi/\text{lambda}_1*\sin(\text{psi}_1)*b_1)$$

results along the contact line on the tool, the desired modification arises over the flank of the tool.

Such a modification can be superimposed with other modifications (e.g. convexities) on the dressing of the tool.

It two involute spur gears mesh at crossed axial angles, the flanks only contact one another at one point.

In the generation path-width diagram, the contact points each move on a straight line ($G_1$ or $G_2$). If the tool has a modification of $$f(2*pi/\text{lambda}_1*\cos(\text{psi}_1)*L_1 - 2*pi/\text{lambda}_1*\sin(\text{psi}_1)*b_1)$$

a point on $G_1$, as discussed above, is a modification of the form f( ). The compression of the modification depends on $\text{lambda}_1$ and $\text{psi}_1$ and on the direction $G_1$.

Each point on $G_1$ images its modification on the corresponding point on $G_2$. A modification of the form f( ) along $G_2$ thus likewise arises on the workpiece. Its compression depends on $\text{lambda}_1$, $\text{psi}_1$ and on the direction of $G_1$ and $G_2$.

The directions can be influenced both via the macrogeometry of the tool (pitch number/tooth number, base module, base helix angle), that is also via the respective axial feeds (shift movement). The compression of (f) along $G_2$ can be set by a correct choice of these parameters so that it corresponds to the desired modification on the workpiece.

In accordance with the present disclosure, the macrogeometry of the tool and/or the line of engagement of the dressing tool and/or the axial feed of the workpiece and/or the shift movement of the tool and/or the compression factor c are selected in particular so that the modification of the tool along a line $G_1$ on which the contact point moves on the machining of the workpiece on the tool corresponds to the desired modification of the workpiece along a line $G_2$ on which the contact point moves on the workpiece.

This corresponds to the demand that the parameters of the method are selected so that the arguments of the function f( ) on the lines $G_1$ and $G_2$ in the points which contact one another in the machining have the same phasing.

In accordance with the present disclosure, with a predefined macrogeometry of the tool and line of engagement of the dressing tool, the axial feed of the workpiece and/or the shift movement of the tool and/or the compression factor c can in particular be selected accordingly in this respect.

Work is particularly preferably carried out in this respect with an axial feed of the workpiece which is usually otherwise predefined by the machining process, whereas the shift movement of the tool and/or the compression factor c are selected in accordance with the present disclosure to satisfy the above-named condition.

In this respect, a value of the axial feed constant with respect to the workpiece rotation and/or a value of the shift movement constant with respect to the tool rotation can be selected.

Each tooth of the workpiece comes into engagement again and again with the same pitch/tooth of the tool during the process. Continuously different points contact one another in this respect due to the axial feed. It must be ensured that the modification on the worm corresponds to the desired modification on the gear on each engagement. It is sufficient for this purpose to ensure this for the first following engagement and then also only for one contact point. For this purpose, the macrogeometry of the tool and the axial feeds can again be adapted.

In accordance with the present disclosure, the macrogeometry of the tool and/or the line of engagement of the dressing tool and/or the axial feed of the workpiece and/or the shift movement of the tool and/or the compression factor c can therefore in particular be selected so that the modifications of the tool and of the workpiece also correspond along the lines $G_{1'}$ and $G_{2'}$ on which the contact points move on the machining of the same tooth of the workpiece with the same pitch of the tool at a later time of the machining process, with these lines being displaced by the axial feed of the workpiece and optionally by the shifting of the tool with respect to the lines $G_1$ and $G_2$.

In this respect, with a predefined macrogeometry of the tool and line of engagement of the dressing tool, the axial feed of the workpiece and/or the shift movement of the tool and/or the compression factor c are in turn preferably selected accordingly.

In addition, with a predefined axial feed of the workpiece, the shift movement of the tool and/or the compression factor c are particularly preferably selected accordingly.

Since on generation grinding or on honing, a linear correlation exists between the generation patterns of the tool and of the workpiece which can be described mathematically, the process parameters for the machining described in more detail above can be mathematically determined via this correlation.

The present disclosure in this respect further comprises a computer program with memory having stored therein an input function for inputting data on a desired modification of the workpiece and having a function for determining the macrogeometry of the tool and/or of the line of engagement of the dressing tool and/or the axial feed of the workpiece and/or the shift movement of the tool and/or of the compression factor c in a manner such that the modification of the tool along a line $G_1$ on which the contact point moves in the machining of the workpiece on the tool corresponds to the desired modification of the workpiece along a line $G_2$ on which the contact point on the workpiece moves.

The computer program can in this respect in particular be suitable for installation on a gear cutting machine or can be installed on same. The parameters determined by the computer program can in particular then be used directly for controlling the gear cutting machine on the dressing and/or machining of a workpiece.

The computer program can, however, also be installed on an external computer. It then advantageously has an output function for data which can be used for controlling a gear cutting machine.

The computer program is in particular set up in this respect so that it implements the above-described functions of the method in accordance with the present disclosure.

The input function can in particular in this respect allow the inputting of data on the first direction ($G_{C2}$) of the workpiece in which the modification has a constant value and/or on the function f(x) which defines the extent of the modification in a second direction of the workpiece which extends perpendicular to the first direction ($G_{C2}$).

Further advantageously, the input function can furthermore allow the inputting of data on the macrogeometry of the tool and/or the line of engagement of the dressing tool and/or on the axial feed of the workpiece and/or on the shift movement of the tool, particularly preferably data on the macrogeometry of the tool and on the line of engagement of the dressing tool and optionally on the axial feed of the workpiece.

The computer program in this respect preferably calculates the shift movement of the tool and/or the compression factor c on the basis of the input data.

With the tool set or modified in this manner, the workpieces can then be machined and the desired profile waviness can thus be generated at the ground workpiece or an unwanted waviness present at the workpiece can be measured and can optionally also be corrected by reversing the process. The workpieces can then be processed in grinding in the axial or diagonal process. When honing, the machining processes in accordance with the prior art can be used.

Both single-start and multi-start tools can be considered as tools which are modified in accordance with the present disclosure. In this respect, the tools are in particular a worm grinding wheel or a honing tool.

Some correlations and procedures which, where not otherwise stated, are used both in the first aspect of the present disclosure, i.e., in the specific use of an imbalance, and in the second aspect, i.e., in the specific eccentric modification of the tool, will now be presented generally again in the following.

In the axial grinding process the tool movement takes place parallel or approximate to the workpiece axis of the workpiece. The structure of the flank surface which was machined using a tool in accordance with the present disclosure receives a profile waviness which remains almost the same in the width direction in this respect. This waviness in the profile extends parallel to the tooth base and to the tooth head.

If the tool is additionally shifted in the direction of the tool axis, in this diagonal grinding process the flank modification or flank waviness is also offset obliquely on the flank over the workpiece width in dependence on the engagement conditions. The extent of the slant can be determined via the shift direction (with the rotary movement of the workpiece or opposite thereto).

The method in accordance with the present disclosure can therefore furthermore comprise the steps: Defining a desired alignment of the periodic flank modification; and moving the grinding tool continuously in the axial direction of the workpiece and/or shifting the grinding tool tangentially to the workpiece to obtain the desired alignment of the flank modification.

In a further embodiment of the present disclosure, the tool can also be eccentrically dressed in order thus preferably to generate a profile modification or profile waviness on the flank of the gear in the diagonal grinding process (shift movement of the tool in the axial direction of the tool). These tools can then be set by the balancing on the machine so that no vibrations arise from the tool rotation or the balancing can additionally be utilized in order also to induce micromovements of the tool here again in addition to the eccentricity movements of the tool surface.

The eccentric dressing of the tool in this respect takes place in that the dresser is fed in more or less in dependence on the angular position of the tool or in that the tool is fed in more or less toward the dresser in dependence on the angular position of the tool or vice versa. Since the speed of the tool in dressing is currently usually lower than in the actual machining process, the dynamic demands on the infeed axis for the tool are not as high as if the infeed movement itself were to take place during the machining process by a radial infeed of the tool toward the workpiece. This radial infeed movement would then have to be controlled in dependence on the angular position of the tool in this respect.

On single-flank dressing, it is furthermore conceivable to generate the infeed movement via an additional axial movement in the axial direction of the tool, which takes place in dependence on the angular position of the tool.

In principle, with highly dynamic grinding machines it is, however, also conceivable with a round-dressed grinding tool to generate movements on the workpiece by radial movements of the grinding tool which correspond to a movement of the tool surface of an eccentrically dressed grinding tool. Optionally, an additional second, highly dynamic infeed axle, which is seated on the first radial infeed axle, could also be used for generating these radial movements.

The method in accordance with the present disclosure can therefore furthermore comprise the steps: Defining a desired amplitude of the periodic flank modification; and direct setting of an imbalance and/or of an eccentricity of the tool for manufacturing a workpiece with the desired flank modification.

The magnitude of the infeed movement or of the eccentricity in this respect lies in the micrometer range since the amplitude of the structures or waviness on the tooth flank likewise only lie in the micrometer range.

The desired amplitude of the periodic flank modification in this respect advantageously amounts up to 7 micrometers in particular between 1 and 5 micrometers.

Further advantageously, the amplitude of the dressing-induced or imbalance-induced eccentricity of the tool used in the method in accordance with the present disclosure lies in this respect between 2 micrometers and 20 micrometers, in particular between 3 and 15 micrometers.

The method in accordance with the present disclosure can therefore furthermore comprise the steps: Defining a desired frequency of the periodic flank modification; and modification of the angle of engagement $\alpha_{n0}$ at the grinding tool for manufacturing a workpiece with the desired flank modification.

The present disclosure further comprises a grinding tool for carrying out a method in accordance with the present disclosure, with the tool being out-of-round-dressed in at least a partial region. In this respect, the tool can have at least two different grinding regions, in particular at least one roughing region and at least one out-of-round dressed finishing region.

The present disclosure further comprises a worm grinding wheel for the carrying out of a method in accordance with the present disclosure, characterized in that the pitch ends of the worm pitches at the two ends of the worm grinding wheel are arranged at different angular positions at the outer periphery.

The present disclosure further comprises a gear cutting machine for carrying out the method in accordance with the present disclosure for balancing and/or for eccentrically dressing a tool, in particular for dressing a tool in accordance with the formulae set forth above. The gear cutting machine can furthermore be suitable for producing a workpiece in accordance with the method in accordance with the present disclosure. It is particularly preferred if all the methods can be carried out in mutual coordination on the gear cutting machine.

The gear cutting machine can in this respect comprise an input function via which a desired amplitude of the periodic flank modification can be predefined and a control function which determines the imbalance and/or eccentricity required to provide the flank modification and sets it for the hard finishing of a workpiece with the desired flank modification.

The gear cutting machine can alternatively or additionally comprise an input function via which a desired imbalance and/or eccentricity can be predefined and a control function which sets the desired imbalance for machining a workpiece with the desired flank modification.

The gear cutting machine can in this respect in particular have a balancing function via which the required imbalance can be set.

The gear-cutting machine can alternatively or additionally have a function for generating a desired modification of the workpiece by an eccentrically dressed tool.

The present disclosure furthermore comprises a gear cutting machine having a machining function which sets the engagement depth of the tool into the workpiece in dependence on the angle of rotation of the tool.

The present disclosure further comprises a gear cutting machine for dressing a hard finishing tool, in particular a worm grinding wheel or a honing tool, having a dressing tool, wherein the gear cutting machine has a function for the out-of-round dressing of the tool which advantageously sets the engagement depth of the dressing tool into the tool in dependence on the angle of rotation of the tool.

Further advantages and properties of the present disclosure will be explained in more detail in the following with reference to the drawings.

BRIEF DESCRIPTION OF THE FIGURES

FIG. 2*a* shows a worm grinding wheel in an embodiment which has a predominantly static imbalance.

FIG. 2*b* shows a worm grinding wheel in an embodiment which has a predominantly dynamic imbalance.

FIG. 4*a* shows a workpiece profile of a workpiece ground axially with the influence of imbalance.

FIG. 4*b* shows a workpiece profile of a workpiece ground diagonally with the influence of imbalance.

FIG. 5 shows a generation path/generation width diagram of the flank surface of a tooth with periodic waviness which was generated using a dressing process in accordance with the present disclosure.

FIG. 6 shows waviness or wavelength on the tooth flank at two defined angles to the straight line $G_c$.

DETAILED DESCRIPTION

Figure 1:
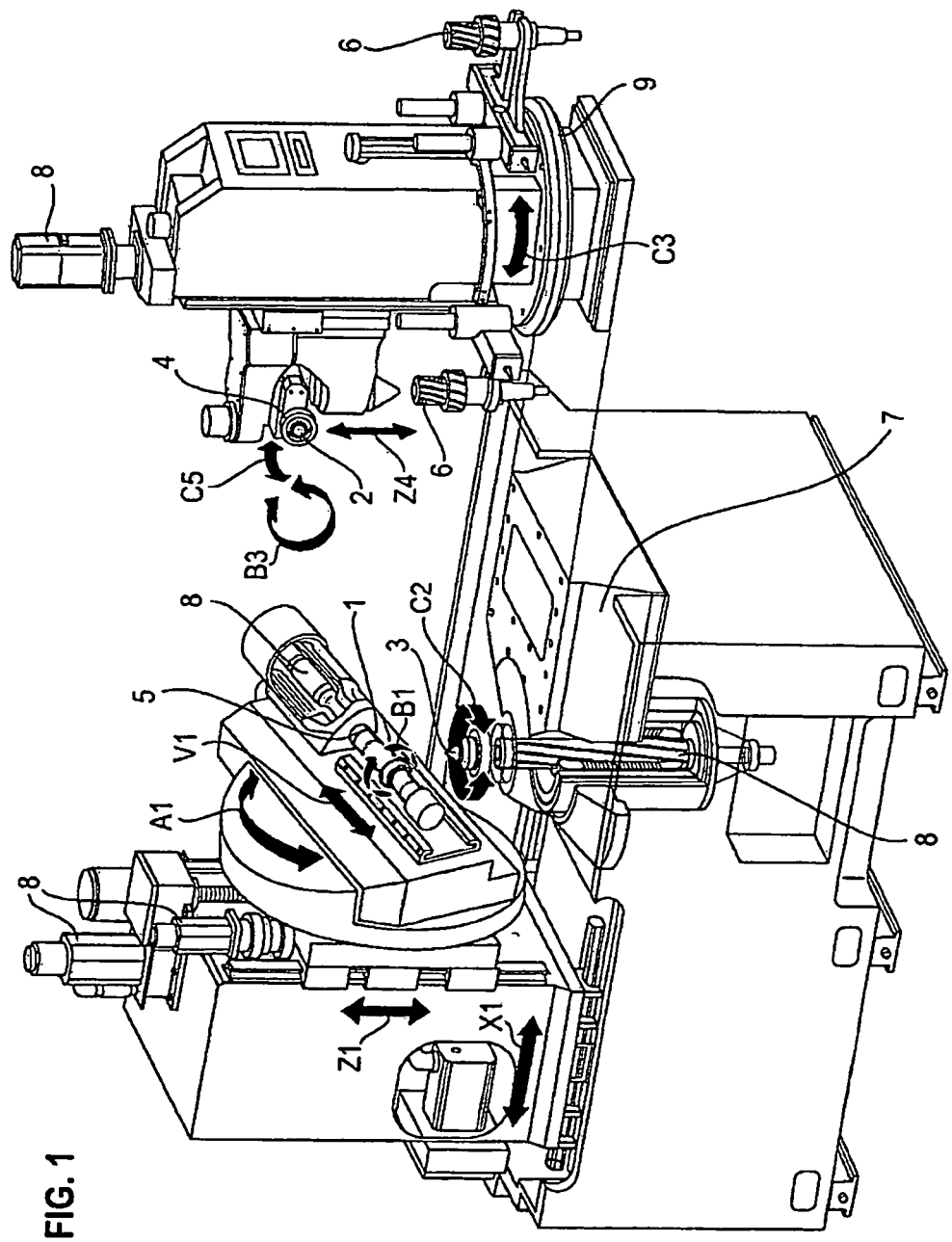
FIG. 1 shows a gear cutting machine in accordance with the prior art.

FIG. 1 shows a perspective view of a gear cutting machine, in particular of a generation grinding and profile grinding machine for carrying out the methods in accordance with the present disclosure for manufacturing a profile modification or profile waviness, in particular of a periodic flank waviness, on a workpiece to be gear cut. The gear cutting machine in this respect has the degrees of freedom required for the machining and can in particular carry out the drawn movements A1, B1, B3, C2, C3, C5, V1, X1, Z1 and Z4. In detail, X1 describes the radial movement of the pedestal carriage; V1 the tangential movement or shift movement of the tool; Z1 the axial movement of the tool; B1 the rotary movement of the tool; C2 the rotary movement of the workpiece; A1 the pivot movement of the tool; Z4 the vertical movement of the counter-holder; C3 the rotary movement of the ring charger; B3 the rotary movement of the dressing tool; and C5 the pivot angle of the dressing tool for varying the angle of engagement α at the grinding tool.

The balancing device for carrying out the first aspect of the present disclosure is in this respect either attached to the machining head (8) or installed in the mounting mandrel (5) for the grinding tool. Vibration sensors which are attached to the machining head (8) measure the vibrations induced by imbalance during the balancing process. In a machine-integrated control, the setting value for the subsequent balancing process is calculated therefrom and is forwarded to the balancing device as control signals. The values for the control signals still have to be modified or corrected in accordance with the desired dynamic imbalance for the application of the method in accordance with the present disclosure.

FIGS. 2a and 2b show a schematic representation of a grinding tool. The representation in accordance with FIG. 2a discloses a side view of the surface of a worm grinding wheel. The circled regions each represent the pitch end of a worm pitch of the grinding tool. In this case, a single-start grinding tool is shown. In this representation, they end 180° offset at the periphery of the worm grinding wheel. This results in a mainly static imbalance error in grinding.

FIG. 2b now shows the grinding tool of the same construction in which the working region on the worm grinding wheel is selected so that it amounts to a whole number, odd-number multiple of half the pitch height. Grinding tools designed in this manner have a primarily dynamic imbalance. A single-start grinding tool is again also shown here.

With grinding tools in accordance with an embodiment of the present disclosure, the pitch ends of the worm pitches will lie between the two maximum characteristics shown in FIG. 2a and FIG. 2b in order thus directly to generate a balance/imbalance at the tool.

Figure 3:
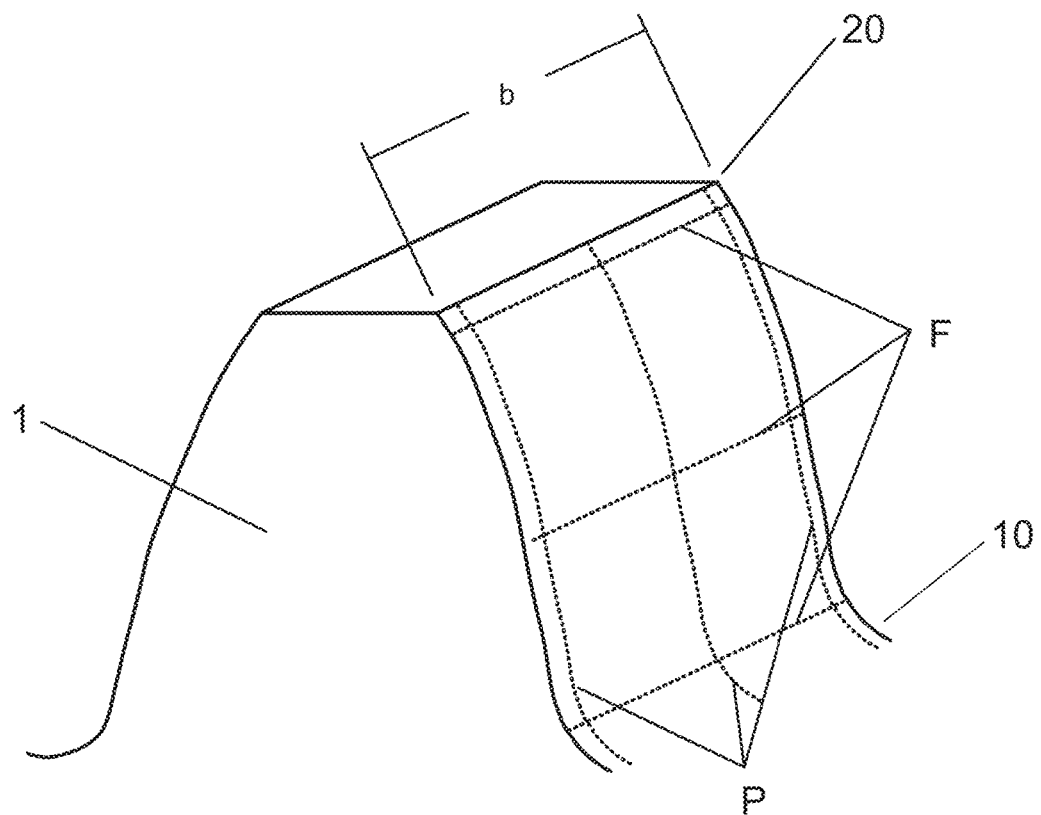
FIG. 3 shows a workpiece profile of a workpiece machined without the influence of imbalance.

FIG. 3 shows a perspective side view of the upper side of an individual tooth (1). The flank geometry is described by the profile (P) and flank lines (F), wherein the profile lines extend on each flank side from the tooth crest (20) up to the tooth base region (10). The flank lines (F) extend over the total tooth width (b), i.e., transversely to the alignment of the profile lines (P). A non-corrected, non-modified tooth of a workpiece is shown.

FIG. 4a now shows a three-dimensional representation of a possible tooth flank structure of an individual tooth (1) of a gear. The periodic structure parallel to the flank direction arises in a grinding process in which the tool, having a balance correction or an eccentric modification of the tool in accordance with the present disclosure, is moved parallel to the axial direction of the workpiece.

In the representation, the amplitude development of the surface waviness of the tooth flank is entered over an ideally ground gear without waviness (dashed line). For clarity, the flanks (F) and the profile lines (P) are likewise marked which are defined in FIG. 3. It can furthermore be seen from the Figure that the flank structure is constant in the transverse direction, i.e. over the total tooth width (b), that is has no waviness in this orientation. The wave propagation extends only from the tooth crest (20) to the tooth base (10).

In this respect it applies in the first aspect of the present disclosure:

The greater the balance/imbalance and the microwobble of the tool about its center axis caused thereby is, the larger the amplitude of the waviness becomes. The microwobble movement of the tool is in this respect larger at the tool margins than at the tool center.

However, this also simultaneously means that the shift position of the tool can also be used for controlling the amplitude or that the tool balancing is adapted in dependence on the shift position located in engagement to keep the waviness amplitude constant.

In the second aspect of the present disclosure, the modification of the tool is in contrast carried out identically over the total length of the tool. The shift movement has, however, an influence on the alignment of the waviness on the tooth flank.

In both aspects, the macrogeometry of the tool, in particular the number and the gradient of the pitches as well as the angle of engagement to the workpiece, have effects on the modifications:

The number of the worm grinding wheel pitches is shown in the parameters of phasing and phase frequency as a modification of the macrogeometry of the gear.

The profile cover $\varepsilon_\alpha$ also enters into the waviness. The greater $\varepsilon_\alpha$ is, the more waves are formed on the profile. The profile cover $\varepsilon_\alpha$ can be increased or decreased by modification of the angle of engagement $\alpha_{n0}$ at the worm grinding wheel. The angle of engagement at the grinding tool is modified in that the dressing tool is pivoted about its C5 axis before the grinding tool is dressed therewith. A slight variation of the angle of engagement $\alpha_{n0}$ at the grinding tool over the tool width can be applied in part when the grinding tool is used in the diagonal grinding process.

The method in accordance with the present disclosure can also be carried out as a diagonal grinding process in that additionally a tangential movement (V1) of the grinding tool to the workpiece is implemented during a grinding stroke. Shown in FIG. 4b, the wave development is then produced as a result at the flank obliquely in the direction of the flank width. A wave propagation takes place so-to-say both in the longitudinal flank direction and in the transverse flank direction. The angle of the wave propagation with respect to the longitudinal flank axis is determined via the tangential movement in the (VI) direction.

If the grinding tool is shifted by a tool division in the machining of the tooth flank, the phasing at the end is thus the same as at the start. If a shift by half a division is made, a phase shift of the waviness over the tooth width takes place and the phasing at the end is displaced by half the wavelength with respect to the phasing at the start of the gear.

As already explained, in addition to the possibility of generating the waviness via microwobble movements caused by a tool balance/imbalance, there is furthermore the variant of dressing the tool directly eccentrically at its periphery. As the operation at the tool manifests identically, this likewise produces the desired waviness on the tooth flank(s) on grinding. The tool can in this respect be balanced by the balancing unit on the grinding machine so that no vibrations generating wobble are induced by the tool. The greater the eccentricity of the tool about its center axis, the greater the amplitude of the waviness becomes.

This provides the possibility of only eccentrically dressing part widths of the worm grinding wheel and of leaving the remaining region(s) uncorrected. Only the finishing region which determines the final workpiece quality can then e.g. be corrected. The roughing region of the worm grinding wheel remains in the uncorrected design.

Dressable worm grinding wheels of, e.g., ceramically bound corundum, SG or also dressable CBN tools are provided as a grinding tool in the sense of the present disclosure. A use of galvanically bound CBN tools would, however, also by all means be conceivable if they have devices for influencing the balancing or for setting an eccentricity. These tools would then have longer service lives, but would no longer be so flexibly variable.

FIG. 5 shows a generation path-width diagram of a tooth flank which was machined with a hard finishing tool whose surface was modified during the dressing/profiling process with the object of generating periodic surface modifications on the tooth flank in accordance with the present disclosure.

FIG. 6 in this respect shows the surface extent on the tooth flank at two defined angles to the straight line $G_c$.

The present disclosure will furthermore be described by the following aspects which are also each individually per se and in combination the subject of the present application independently of the previously described embodiments.

1. Setting the balance of a worm grinding wheel with the object of generating specific wobble movements of the tool by a tool balance/imbalance which in turn cause a defined flank waviness in the machining of the gear.
2. Modifying a worm grinding wheel on its manufacture in that the worm grinding wheel width is determined so that the pitch ends of the worm pitches are arranged at different angular positions at the outer periphery and thus a defined balance or imbalance is directly caused.
3. Combining 1 and 2.
4. Modifying the flank surface of a gear by direct eccentric dressing of a worm grinding wheel with the object of specifically generating a flank waviness on the gear using a balanced grinding tool by out-of-round movements of the active grinding wheel surface.
5. Modifying the flank surface of a gear by direct eccentric dressing of a worm grinding wheel with the object of specifically generating a flank waviness on the gear and additionally of superimposing a balance/imbalance using a balanced grinding tool by out-of-round movements of the active grinding wheel surface.
6. Dressing process for dressing a hard finishing tool in which surface structures which generate a periodic flank waviness on a flank machined therewith are generated on the tool during the dressing and profiling process. The shape of the periodic modifications is defined by a real-valued function.
7. Axial grinding with a worm directly coordinated "imbalanced"/eccentric.
8. Diagonal grinding with a worm directly coordinated "imbalanced"/eccentric.
9. Setting the balance/imbalance of a worm grinding wheel with the object of setting the magnitude of the amplitude of the flank waviness on the flank surface.
10. Single-flank waviness on the gear surface.
11. Modifying the angle of engagement in the grinding tool to set the number of waves on the flank surface.
12. Dividing the grinding tool in accordance with the present disclosure into an uncorrected roughing region and a corrected finishing region.
13. Dressable grinding tool and galvanic CBN tool.
14. Galvanically bound grinding tool with an additional device for generating a balance/imbalance and/or an eccentricity.
15. A gear cutting machine for applying the methods.

The present disclosure will furthermore also be described by the following further aspects which are also the subject of the present application independently of the previously described embodiments and in each case individually per se as well as in combination with one another and in combination with the previously described aspects.

Aspects for using an imbalance:
1. A method for the manufacture of a workpiece having a corrected gear geometry and/or a modified surface structure, in particular by a hard finishing process, in particular generation grinding or honing, characterized in that it is achieved by a direct generation of a wobble movement that a modification, in particular a profile modification or profile waviness, and/or a defined periodic flank waviness is generated on the active surface of the workpiece machined therewith. For example, the method may include manufacturing the workpiece with a corrected gear geometry and/or a modified surface structure by generation grinding or honing, the method comprising directly generating a wobble movement and/or an eccentricity of the tool, the movement/eccentricity modifying a profile, such as profile waviness and/or a defined periodic flank waviness on the active surface of the workpiece machined therewith.
2. A method in accordance with aspect 1, characterized in that the worm grinding wheel width is determined on the manufacture of the grinding worm wheel such that the pitch ends of the worm pitches at the two ends of the grinding worm wheel are arranged at different angle positions at the outer periphery and thus directly cause a defined imbalance.
3. A method in accordance with aspect 1 or aspect 2, characterized in that a certain imbalance is directly set on the balancing of the grinding tool, in particular on the balancing on the grinding machine, so that a specific wobble movement and/or eccentricity movement of the grinding wheel is generated by this balancing method by which a defined periodic flank waviness is achieved on the active surface of the workpiece ground therewith.
4. A method for the manufacture of a workpiece having a corrected gear geometry and/or a modified surface structure, in particular by a hard finishing, in particular by generation grinding, wherein the engagement depth of the worm grinding wheel into the workpiece is varied, in particular periodically, in the machining of the workpiece in dependence on the angle of rotation of the tool, in particular of the worm grinding wheel.
5. A method in accordance with one of the aspects 1 to 4, characterized in that the grinding tool is dressed in an out-of-round manner; and/or in that the worm grinding wheel width is determined such that the pitch ends of the worm pitches at the two ends of the worm grinding wheel are arranged at different angle positions at the outer periphery and/or additionally the balance in the machine is modified.
6. A method of grinding a workpiece having a corrected gear geometry and/or a modified surface structure in accordance with one of the preceding aspects, wherein a periodic flank modification is generated on only one tooth flank of the workpiece.
7. A method of hard finishing a workpiece having a corrected gear geometry and/or a modified surface structure in accordance with one of the preceding aspects, the method comprising the steps: defining a desired amplitude of the periodic flank modification; and direct setting of an imbalance and/or of an eccentricity and/or a tool modification in the dressing of the tool for manufacturing a workpiece having the desired flank modification.
8. A method of hard finishing a workpiece having a corrected gear geometry and/or a modified surface structure in accordance with one of the preceding aspects, the method comprising the steps: defining a desired frequency of the periodic flank modification; and modifying the angle of engagement $\alpha_{n0}$ at the tool for manufacturing a workpiece having the desired flank modification.
9. A method in accordance with any one of the preceding aspects, the method comprising the steps: defining a desired alignment of the periodic flank modification; and moving the grinding tool continuously in the axial direction of the workpiece and/or shifting the tool tangentially to the workpiece to obtain the desired alignment of the flank modification.
10. A worm grinding wheel for carrying out a method in accordance with one of the preceding claims, characterized in that the pitch ends of the worm pitches at the two ends of the worm grinding wheel are arranged at different angle positions at the outer periphery.

11. A gear cutting machine for carrying out the method in accordance with one of the aspects 1 to 9, wherein the gear cutting machine advantageously has an input function via which a desired amplitude of the periodic flank modification can be predefined and comprises a control function which determines the imbalance and/or eccentricity required for providing the flank modification and sets it for grinding a workpiece having the desired flank modification, and/or an input function via which a desired imbalance and/or eccentricity can be predefined and a control function which sets the desired imbalance for grinding a workpiece having the desired flank modification and/or an input function via which an angle of engagement $\alpha_{n0}$ and/or a modification of the angle of engagement $\alpha_{n0}$ can be predefined and a control function which sets the desired angle of engagement $\alpha_{n0}$ at the tool for grinding a workpiece having the desired flank modification.

12. A gear cutting machine in accordance with aspect 11 for gear cutting a workpiece with a worm grinding wheel, characterized in that the gear cutting machine has a balancing function via which the required imbalance can be set and/or has a machining function which sets the engagement depth of the worm grinding wheel into the workpiece in dependence on the angle of rotation of the worm grinding wheel.

13. A computer program, in particular for installation on a gear cutting machine, and/or having an output function for data for use on a gear cutting machine, having an input function for inputting data on a desired modification of the workpiece and having a function for determining the imbalance required for providing the flank modification, wherein the functions implement a method in accordance with one of the preceding aspects.

Aspects for the eccentric dressing of the tool:

1. A method of manufacturing a workpiece having a corrected gear geometry and/or a modified surface structure, in particular by a hard finishing process, in particular by generation grinding or honing, characterized in that a modification, in particular a profile modification or profile waviness, is generated on the flank of the gear of the workpiece machined therewith by a specific eccentricity of the tool.
2. A method in accordance with aspect 1, wherein the tool for generating the specific eccentricity is dressed out-of-round on dressing and/or profiling, and/or wherein it is achieved by the specific eccentricity of the tool that a defined, for example periodic, flank waviness is generated on the active surface of the workpiece machined therewith, in particular in a diagonal grinding process.
3. A method in accordance with one of the preceding aspects, wherein the tool is dressed out-of-round by a forming roller.
4. A method in accordance with aspect 3, wherein the forming roller is in contact with the tooth of the tool from the base region up to the crest region on the dressing so that the eccentric modification takes place in one stroke over the whole tooth height; or alternatively the forming roller is only in contact with the tooth of the tool in part regions between the base and the crest on the dressing so that the eccentric modification takes place in a plurality of strokes and in a respectively different relative positioning over the total tooth height.
5. A method in accordance with one of the preceding aspects, wherein the eccentric dressing of the tool takes place in that one or more of the following corrections of the axial movements are carried out with respect to conventional dressing kinematics:
    a) Variation of the axial spacing of the dresser from the tool in dependence on the angle of rotation of the tool or on the tool width (infeed);
    b) Variation of the axial infeed of the tool or of the dresser in dependence on the angle of rotation of the tool or on the tool width (shift);
    c) Variation of the crossed-axis angle of the tool and of the dresser in dependence on the angle of rotation of the tool or on the tool width (pivot);
    d) Variation of the tool speed in dependence on the angle of rotation of the tool or on the tool width;
   and/or wherein the eccentric dressing of the tool takes place in that the dresser is fed in more or less in dependence on the angular position of the tools or in that the tool is fed in more or less toward to the dresser in dependence on its angle position, or
   vice versa.
6. A method in accordance with one of the preceding aspects, wherein the desired modification of the surface geometry of the workpiece on the gear flank has a constant value at least locally in a first direction ($G_{C2}$) of the workpiece and is given by a function f(x) in a second direction of the workpiece which extends perpendicular to the first direction ($G_{C2}$);
   and wherein the modification of the surface geometry of the tool used for manufacturing this modification of the surface geometry of the workpiece has a constant value in the generation pattern at least locally in a first direction ($G_{C1}$) of the tool and is further given by the same function f(cx), optionally compressed linearly by a factor c, in a second direction of the tool which extends perpendicular to the first direction ($G_{C1}$), wherein the desired modification of the surface geometry of the workpiece on the gear flank is defined at least locally in the generation pattern at the generation length position $L_2$ and at the tooth width position $b_2$ by the formula:

$$f(2*pi/\text{lambda}_2*\cos(\text{psi}_2)*L_2 - 2*pi/\text{lambda}_2*\sin(\text{psi}_2)*b_2)$$

wherein the angle $\text{psi}_2$ indicates the direction ($G_{C2}$) on the gear flank on which the modification has a constant value, while the modification in every other direction has the form of f( ), wherein $\text{lambda}_2$ defines the wavelength of the modification in a direction perpendicular to the first direction ($G_{C2}$) at a periodicity of f-( ) over 2*pi and wherein the modification of the surface geometry of the tool in the generation pattern used for this purpose is defined at the longitudinal generation position $L_1$ and at the tooth width position $b_1$ at least locally by the formula:

$$f(2*pi/\text{lambda}_1*\cos(\text{psi}_1)*L_1 - 2*pi/\text{lambda}_1*\sin(\text{psi}_1)*b_1)$$

wherein the angle $\text{psi}_1$ indicates the direction ($G_{C1}$) on the gear flank on which the modification has a constant value, while the modification along every other direction has the form of f( ), wherein $\text{lambda}_1$ defines the wavelength of the modification in a direction perpendicular to the first direction ($G_{C1}$) at a periodicity of f( ) over 2*pi, and/or wherein the first direction ($G_{C1}$) of the tool in which the modification has a constant value corresponds to the line of engagement of the dressing tool, in particular of a forming roller, with the tool during dressing, wherein this direction is at least locally approximated by a straight line $G_1$, wherein the first direction ($G_{C2}$) of the tool in which the modification has a constant value corresponds to the line of engagement of the dressing tool, in particular of a forming roller, with the tool during dressing.

7. A method in accordance with one of the preceding aspects, wherein the modifications generated by the method are used to compensate unwanted deviations and/or waviness of the surface of the workpiece, in particular to eliminate deviations and/or waviness of the surface of the workpiece which are caused by irregularities in the machine dynamics and/or by the machine dynamics and/or by insufficient balancing quality.

8. A method in accordance with any one of the preceding aspects, the method comprising the steps: defining a desired amplitude of the periodic flank modification; and direct setting of an eccentricity and/or a tool modification in the dressing of the tool for manufacturing a workpiece having the desired flank modification and/or the method comprising the steps: defining a desired alignment of the periodic flank modification; and moving the grinding tool continuously in the axial direction of the workpiece and/or shifting the tool tangentially to the workpiece to obtain the desired alignment of the flank modification.

9. A method in accordance with one of the preceding aspects, wherein the macrogeometry of the tool and/or the line of engagement of the dressing tool and/or the axial feed of the workpiece and/or the shift movement of the tool and/or the compression factor c are selected so that the modification of the tool along a line $G_1$ on which the contact point moves on the machining of the workpiece on the tool corresponds to the desired modification of the workpiece along a line $G_2$ on which the contact point moves on the workpiece, wherein with a predefined macrogeometry of the tool and line of engagement of the dressing tool the axial feed of the workpiece and/or the shift movement of the tool and/or the compression factor c are selected accordingly, wherein further with a predefined axial feed of the workpiece the shift movement of the tool and/or the compression factor c are selected accordingly.

10. A method in accordance with aspect 9, wherein the macrogeometry of the tools and/or the line of engagement of the dressing tool and/or the axial feed of the workpiece and/or the shift movement of the tool and/or the compression factor c are selected so that the modifications of the tool and of the workpiece also correspond along the lines $G_{1'}$, and $G_{2'}$ on which the contact points move on the machining of the same tooth of the workpiece with the same pitch of the tool at a later time of the machining process, with these lines being displaced by the axial feed of the workpiece and optionally by the shifting of the tool with respect to the lines $G_1$ and $G_2$, wherein with a predefined macrogeometry of the tool and line of engagement of the dressing tool the axial feed of the workpiece and/or the shift movement of the tool and/or the compression factor c are selected accordingly, wherein further with a predefined axial feed of the workpiece the shift movement of the tool and/or the compression factor c are selected accordingly.

11. A method for dressing and/or profiling a tool, wherein the tool is dressed out-of-round so that a specific eccentricity movement of the tool can be generated by which a defined periodic flank waviness is achieved on the active surface of the workpiece machined therewith, in particular for providing a tool for a method in accordance with one of the preceding aspects.

12. A tool, in particular for carrying out a method in accordance with one of the preceding aspects, characterized in that the tool is dressed out-of-round in at least a partial region, wherein the tool advantageously has at least two different machining regions in particular at least one roughing region and at least one finishing region dressed out-of-round.

13. A gear cutting machine for dressing a worm gear wheel having a dressing tool, in particular a gear cutting machine for carrying out a method in accordance with the preceding aspects, characterized in that the gear cutting machine has the function for the out-of-round dressing of a tool, in particular of a worm gear wheel, which advantageously sets the depth of engagement of the dressing tool into the tool in dependence on the angle of rotation of the worm gear wheel.

14. A gear cutting machine, in particular for carrying out a method in accordance with one of the preceding aspects, in particular a gear cutting machine in accordance with aspect 13, having a function for generating a desired modification of the workpiece by an eccentrically dressed tool, wherein the gear cutting machine advantageously has an input function via which a desired amplitude of the periodic flank modification can be predefined and a control function which determines the eccentricity required for providing the flank modification and sets it for grinding a workpiece having the desired flank modification.

15. A computer program, in particular for installation on a gear cutting machine, and/or having an output function for data for use on a gear cutting machine, having an input function for inputting data on a desired modification of the workpiece and having a function for determining the macrogeometry of the tool and/or of the line of engagement of the dressing tool and/or the axial feed of the workpiece and/or the shift movement of the tool and/or of the compression factor c such that the modification of the tool along a line $G_1$ on which the contact point moves on the machining of the workpiece on the tool corresponds to the desired modification of the workpiece along a line $G_2$ on which the contact point on the workpiece moves, wherein the functions implement a method in accordance with one of the preceding aspects.

The present disclosure in this respect relates to any desired hard finishing processes and in particular to generation grinding and to gear honing. The two processes substantially only differ by the crossed-axis angle between the tool and the workpiece.

In generation milling, this is usually in the order of magnitude of around 90°±5°; in honing usually between 5° and 25° and with lower cutting speeds.

The invention claimed is:

1. A method for manufacturing a workpiece, comprising:
generating a modified gear flank geometry on an active surface of the workpiece by generation grinding or honing,
wherein the modified gear flank geometry of the workpiece is generated on the active surface of the workpiece by a generation of a wobble movement of a tool or by a modified gear flank geometry of a tool, the tool being used for machining the workpiece by generation grinding or honing, the modified gear flank geometry of the tool being provided by a variation of a gear flank geometry of the tool in dependence on an angular position of the tool, wherein the workpiece comprises a cylindrical spur gear, a helical gear, a spherical gear, or a conical gear, and wherein the modified gear flank geometry of the workpiece includes at least one of a profile waviness or a defined periodic flank waviness.

2. The method in accordance with claim 1, wherein generating the modified gear flank geometry of the workpiece includes a hard finishing process, wherein the tool comprises a worm grinding wheel, and wherein a width of the worm grinding wheel is selected such that pitch ends of worm pitches at two ends of the worm grinding wheel are arranged at different angular positions at an outer periphery of the worm grinding wheel, thereby directly creating a defined imbalance.

3. The method in accordance with claim 1, wherein the tool has a defined imbalance, the defined imbalance generating the wobble movement of the tool, and the defined imbalance generating the defined periodic flank waviness on the active surface of the workpiece.

4. The method in accordance with claim 1, wherein the modified gear flank geometry of the tool is generated during dressing, and wherein the tool is dressed by a forming roller, and wherein the variation of the gear flank geometry of the tool in dependence on the angular position of the tool comprises the modified gear flank geometry of the tool being formed by varying an engagement depth of the forming roller during dressing of the tool in dependence on the angular position of the tool.

5. The method in accordance with claim 4, wherein the forming roller is only in contact with partial regions of a tooth between a base and a crest during the dressing, forming the modified gear flank geometry of the tool in a plurality of strokes, the plurality of strokes having different relative positions over a total tooth height.

6. The method in accordance with claim 1, wherein the modified gear flank geometry of the tool generates a defined flank waviness in a diagonal grinding process on the active surface of the workpiece.

7. The method in accordance with claim 4, wherein one or more corrections are performed during the dressing of the tool, the corrections comprising:

a. varying an axial spacing of a dresser from the tool based on an angle of rotation of the tool or based on a tool width;

b. varying an axial feed of the tool or of the dresser based on the angle of rotation of the tool or based on the tool width;

c. varying a crossed-axis angle of the tool and of the dresser based on the angle of rotation of the tool or based on the tool width; and d. varying a tool speed in dependence on the angle of rotation of the tool or based on the tool width.

8. The method in accordance with claim 4, wherein the dressing of the tool includes a dresser being fed toward the tool based on the angular position of the tool or the tool being fed toward the dresser based on the angular position of the tool.

9. The method in accordance with claim 1, wherein the modified gear flank geometry of the workpiece has a constant value at least locally in a first direction of the workpiece and is given by a predefined function f(x) in a second direction of the workpiece which extends perpendicular to the first direction of the workpiece, and wherein the modified gear flank geometry of the tool has a constant value in a generation pattern at least locally in a first direction of the tool and is further given by a predefined function f(cx), where c is a linear compression factor, in a second direction of the tool perpendicular to the first direction.

10. The method in accordance with claim 4, wherein the modified gear flank geometry of the tool has a constant value at least locally in a first direction of the tool, is given by a function f(x) in a second direction of the tool which extends perpendicular to the first direction of the tool, wherein the first direction of the tool in which the modified gear flank geometry of the tool has a constant value corresponds to a line of engagement of a dresser, and wherein the first direction of the tool is at least locally approximated by a straight line.

11. The method in accordance with claim 9, wherein one or more of a macrogeometry of the tool, a line of engagement of a dressing tool, an axial feed of the workpiece, a shift movement of the tool, and the linear compression factor c are selected so that the modified gear flank geometry of the tool along a first line corresponds to the modified gear flank geometry of the workpiece along a second line, wherein the first line comprises a line on which a contact point moves on the tool during the manufacture of the workpiece, and wherein the second line comprises a line on which the contact point moves on the workpiece.

12. The method in accordance with claim 11, wherein, if the macrogeometry of the tool and the line of engagement of the dressing tool are predefined, then at least one or more of the axial feed of the workpiece, the shift movement of the tool, and the linear compression factor c are selected based on the macrogeometry and the line of engagement, wherein, if the axial feed of the workpiece is predefined, then at least one or more of the shift movement of the tool and the compression factor c are selected based on the axial feed of the workpiece, wherein at least one or more of the macrogeometry of the tool, the line of engagement of the dressing tool, the axial feed of the workpiece, the shift movement of the tool, and the compression factor c are selected so that the dressing of the tool and the modified gear flank geometry of the workpiece also correspond along third and fourth lines, and wherein the third and fourth lines are displaced by the axial feed of the workpiece and by the shifting of the tool with respect to the first and second lines.

13. The method in accordance with claim 1, wherein the modified gear flank geometry of the workpiece includes the defined periodic flank waviness in a first direction of a flank of the workpiece, the flank not having said defined periodic flank waviness in a second direction, perpendicular to the first direction.

14. The method in accordance with claim 1, wherein the wobble movement of the tool is generated by varying an infeed position of the tool in dependence on the angular position of the tool.

15. The method in accordance with claim 4, wherein the forming roller is in contact with a tooth of the tool from a base region up to a crest region during the dressing, forming the modified gear flank geometry of the tool in one stroke over a whole tooth height.

16. The method in accordance with claim 4, wherein the tool is dressed in the same apparatus as is used to machine the workpiece.

17. The method in accordance with claim 9, wherein the modified gear flank geometry of the workpiece is defined at least locally in the generation pattern at a generation length position $L_2$ and at a tooth width position $b_2$ by the formula:

$$f(2*pi/\text{lambda}_2*\cos(\text{psi}_2)*L_2 - 2*pi/\text{lambda}_2*\sin(\text{psi}_2)*b_2)$$

wherein the angle $\text{psi}_2$ indicates the first direction of the workpiece, while modification in every other direction has the form of f( ), wherein $\text{lambda}_2$ defines a wavelength of the modification in the second direction of the workpiece at a periodicity of f( ) over 2*pi, and wherein the modified gear flank geometry of the tool in the generation pattern is defined at a longitudinal generation position $L_1$ and at a tooth width position $b_1$ at least locally by the formula:

$$f(2*pi/\text{lambda}_1*\cos(\text{psi}_1)*L_1 - 2*pi/\text{lambda}_1*\sin(\text{psi}_1)*b_1)$$

wherein the angle $\text{psi}_1$ indicates the first direction of the tool, while modification along every other direction has the form of f( ), wherein $\text{lambda}_1$ defines a wavelength of the modification in the second direction of the tool, perpendicular to the first direction of the tool at a periodicity of f( ) over 2*pi.

18. A method for manufacturing a workpiece, comprising:
machining the workpiece by generation grinding or honing using a generation grinding or honing tool, the tool having a modified gear flank geometry that comprises a variation of a gear flank geometry in dependence on an angular position of the tool, and in the step of machining the workpiece,
generating a modified gear flank geometry on an active surface of the workpiece by machining the workpiece with the modified gear flank geometry of a tool, wherein the modified gear flank geometry of the tool is generated during dressing, and wherein the tool is dressed by a forming roller, the modified gear flank geometry of the tool being formed by varying an engagement depth of the forming roller during dressing of the tool in dependence on the angular position of the tool.

19. A method for manufacturing a workpiece, comprising
machining the workpiece by generation grinding or honing using a generation grinding or honing tool, the tool having a modified gear flank geometry that comprises a variation of a gear flank geometry in dependence on an angular position of the tool, and in the step of machining the workpiece,
generating a modified gear flank geometry on an active surface of the workpiece by machining the workpiece with the modified gear flank geometry of a tool, wherein the modified gear flank geometry of the tool has a constant value in a generation pattern at least locally in a first direction of the tool and is further given by a predefined non-constant function in a second direction of the tool perpendicular to the first direction.

20. The method in accordance with claim 19, wherein the modified gear flank geometry of the workpiece has a constant value at least locally in a first direction of the workpiece and is further given by a predefined function f(x) in a second direction of the workpiece which extends perpendicular to the first direction of the workpiece, and wherein the modified gear flank geometry of the tool has a constant value in a generation pattern at least locally in a first direction of the tool and is further given by a predefined function f(cx), where c is a linear compression factor, in a second direction of the tool perpendicular to the first direction.

21. The method in accordance with claim 20, wherein one or more of a macrogeometry of the tool, a line of engagement of a dressing tool, an axial feed of the workpiece, a shift movement of the tool, and the linear compression factor c are selected so that the modified gear flank geometry of the tool along a first line corresponds to the modified gear flank geometry of the workpiece along a second line, wherein the first line comprises a line on which a contact point moves on the tool during manufacture of the workpiece, and wherein the second line comprises a line on which the contact point moves on the workpiece.

22. A method for manufacturing a workpiece, comprising:
machining the workpiece by generation grinding or honing using a generation grinding or honing tool, the tool having a modified gear flank geometry that comprises a variation of a gear flank geometry in dependence on an angular position of the tool, and in the step of machining the workpiece,
generating a modified gear flank geometry on an active surface of the workpiece by machining the workpiece with the modified gear flank geometry of a tool, wherein the tool is dressed in the same apparatus as is used to machine the workpiece.

* * * * *